(12) United States Patent
Kim

(10) Patent No.: US 9,705,142 B2
(45) Date of Patent: Jul. 11, 2017

(54) FUEL CELL SYSTEM

(71) Applicant: Hyundai Motor Company, Seoul (KR)

(72) Inventor: Jong Sung Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 661 days.

(21) Appl. No.: 14/290,781

(22) Filed: May 29, 2014

(65) Prior Publication Data

US 2015/0180058 A1    Jun. 25, 2015

(30) Foreign Application Priority Data

Dec. 19, 2013  (KR) .......................... 10-2013-0159600

(51) Int. Cl.
*H01M 8/04119* (2016.01)
*H01M 8/1018* (2016.01)

(52) U.S. Cl.
CPC ... *H01M 8/04126* (2013.01); *H01M 8/04164* (2013.01); *H01M 2008/1095* (2013.01); *H01M 2250/20* (2013.01); *Y02T 90/32* (2013.01)

(58) Field of Classification Search
CPC ......... H01M 8/04126; H01M 8/04164; H01M 8/045; H01M 8/04514
See application file for complete search history.

(56) References Cited

FOREIGN PATENT DOCUMENTS

| JP | 2004-119308 A | 4/2004 |
|---|---|---|
| JP | 2010-170927 A | 8/2010 |

*Primary Examiner* — Barbara Gilliam
*Assistant Examiner* — Nathanael Zemui
(74) *Attorney, Agent, or Firm* — McDermott Will & Emery LLP

(57) ABSTRACT

A fuel cell system capable of adjusting the amount of humidification of reaction gas includes a fuel cell stack in which fuel cells are stacked, an air supplier supplying air to the fuel cell stack, a humidifier humidifying air supplied through the air supplier with air discharged from the fuel cell stack, and a hydrogen supplier supplying hydrogen to the fuel cell stack. A condensate water processor is configured to store and discharge condensate water discharged from the fuel cell stack through a hydrogen exhaust line. A drain line connects an air exhaust line and the hydrogen exhaust line of the fuel cell stack. A water trap is installed in the drain line and stores the condensate water. A water reservoir is installed at a connection point connecting the drain line and the air exhaust line and stores condensate water discharged from the water trap.

13 Claims, 4 Drawing Sheets

FUEL CELL SYSTEM

CROSS-REFERENCE TO RELATED APPLICATION

This application claims the benefit of priority to Korean Patent Application No. 10-2013-0159600 filed in the Korean Intellectual Property Office on Dec. 19, 2013, the entire contents of which are incorporated herein by reference.

TECHNICAL FIELD

The present disclosure relates to a fuel cell system, and more particularly, to a fuel cell system capable of adjusting the amount of humidification of reaction gas flowing into a fuel cell stack.

BACKGROUND

In general, a fuel cell system is a power generation system of supplying air and hydrogen to a fuel cell and generating electrical energy with an electrochemical reaction of hydrogen and oxygen by the fuel cell. For example, the fuel cell system produces power from a fuel cell power plant, a public house, a factory, or the like, and is used for driving a driving source, such as an electric motor, a vehicle, a vessel, a train, an air plane, and the like. The fuel cell system includes a stack in which fuel cells are stacked, a hydrogen supplier for supplying hydrogen to an anode of the fuel cells, and an air supplier for supplying air to a cathode of the fuel cells.

In the case of a polymer fuel cell, appropriate moisture is necessary so as for an ion exchange membrane of a membrane electrode assembly (MEA) to smoothly perform a function, and to this end, the fuel cell system adopts a humidifier for humidifying reaction gas supplied to the fuel cell stack. The humidifier humidifies air supplied from the air supplier by using moisture in high-temperature and humid air discharged from the cathode of the fuel cells and supplies the humidified air to the cathode of the fuel cells. Further, the fuel cell system includes a hydrogen recirculator for mixing hydrogen discharged from the anode of the fuel cells and hydrogen supplied from the hydrogen supplier, and supplying the mixed hydrogen to the anode again.

A flooding phenomenon, in which a large amount of condensate water is left in the anode may be generated in the fuel cell stack. The flooding phenomenon may block hydrogen inflow to the anode by the condensate water to drop cell voltages of the fuel cells.

Accordingly, the fuel cell system includes a water trap and a drain valve as condensate water discharge devices for discharging the condensate water left within the anode of the fuel cells to the outside. The water trap may store condensate water discharged from the anode, and the drain valve may selectively discharge condensate water within the water trap according to a detection signal of a level sensor provided inside the water trap. Here, the water trap is installed in a drain line connecting a hydrogen exhaust line and an air exhaust line of the fuel cell stack, and supplies condensate water to the humidifier in a state where the drain line is opened through the drain valve. However, the condensate water of the water trap flows into the humidifier and moisture re-flows into the fuel cell stack in the flooding condition of the fuel cell, so that the cell voltages of the fuel cells by the flooding phenomenon of the fuel cell may be more seriously decreased.

During high-power driving of the fuel cell stack, high-temperature and dry air is discharged from the fuel cell stack, and there may incur a dry-out phenomenon in which the amount of moisture within the stack is insufficient due to excessive supply of air or high-temperature driving. The dry-out phenomenon may increase electric resistance of the cathode, thereby increasing deviation of a cell voltage. Particularly, movement momentum of air excessively supplied during the high-power driving of the fuel cell stack discharges even moisture necessary in the cathode, and decreases relative humidity of supplied air due to an increase in the amount of saturated water vapor under a high-temperature condition, thereby causing a dry-out phenomenon of the fuel cell stack.

The aforementioned humidity management of the fuel cell stack corresponding to the flooding condition and the dry-out condition of the fuel cell is variously evaluated through a regulative method, and the regulative method has an advantage in that the flooding condition and the dry-out condition of the fuel cell may be improved without adding a separate component. However, the regulative method may degrade fuel efficiency due to additional use of power and fuel according to an operation of a heater, or additional purging of hydrogen and supply of air under the flooding condition of the fuel cell, and performance of forced cooling, forced load, air pressure, and the like under the dry-out condition of the fuel cell.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides a fuel cell system capable of adjusting the amount of humidification of reaction gas flowing into a fuel cell stack by improving a structure of a condensate water discharger without using flooding and dry-out conditions of a fuel cell by a regulative method.

According to an exemplary embodiment of the present disclosure, a fuel cell system includes a fuel cell stack in which fuel cells are stacked and an air supplier configured to supply air to the fuel cell stack. A humidifier is configured to humidify the air supplied through the air supplier with air discharged from the fuel cell stack. A hydrogen supplier is configured to supply hydrogen to the fuel cell stack. The fuel cell system includes a condensate water processor configured to store and discharge condensate water discharged from the fuel cell stack through a hydrogen exhaust line. The condensate water processor includes a drain line configured to connect an air exhaust line and the hydrogen exhaust line of the fuel cell stack. A water trap is installed in the drain line and configured to store the condensate water. A water reservoir is installed at a connection point connecting the drain line and the air exhaust line and configured to store the condensate water discharged from the water trap.

The water reservoir may store a part of the condensate water under a flooding condition of the fuel cell.

The water reservoir may supply the condensate water to the humidifier through the air exhaust line under a dry-out condition of the fuel cell.

The water reservoir may be located at a lower side of the air exhaust line.

The drain line may be connected to a center of a side surface of the water reservoir.

The water reservoir may be connected to a partial section of the air exhaust line.

The water reservoir may be provided with an opening portion in an upper surface thereof, and the opening portion may be connected to the partial section of the air exhaust line.

A porous body may be installed inside the water reservoir.

The porous body may be formed of a porous material of steel use stainless (SUS).

A condensate water storage space having a set area may be formed inside the water reservoir separately from the porous body.

The condensate water storage space may be formed at a connection side of the drain line inside the water reservoir.

A drain valve for selectively discharging condensate water accommodated in the water trap may be installed in the drain line.

According to another exemplary embodiment of the present disclosure, a fuel cell system includes a fuel cell stack, an air supplier, a humidifier, and a hydrogen supplier. The fuel cell system includes a drain line configured to connect an air exhaust side of the fuel cell stack and a hydrogen exhaust side of the fuel cell stack. A water trap is installed in the drain line and configured to store condensate water discharged from the fuel cell stack. A water reservoir is installed at a connection point of the air exhaust side of the fuel cell stack and the drain line and configured to temporarily store the condensate water discharged from the water trap.

The drain line may be connected to a hydrogen exhaust line discharging hydrogen from the fuel cell stack and an air exhaust line connecting the fuel cell stack and the humidifier.

The water reservoir may be disposed at a lower side of the air exhaust line at the connection point connecting the drain line and the air exhaust line.

The drain line may be connected to a center of a side surface of the water reservoir at the connection point.

A porous body may be installed in an internal space of the water reservoir, and the porous body may be installed at an opposite side space to a connection side of the drain line.

According to the exemplary embodiments of the present disclosure, it is possible to decrease the amount of humidification of air flowing into the fuel cell stack by minimizing moisture flowing into the humidifier through the water reservoir under the flooding condition of the fuel cell, thereby minimizing a decrease in a cell voltage and the amount of catalyst loss of the fuel cells due to the flooding phenomenon of the fuel cell.

According to the exemplary embodiments of the present disclosure, it is possible to increase the amount of humidification of air flowing into the fuel cell stack through the water reservoir under the dry-out condition of the fuel cell, thereby decreasing a deviation of cell voltages of the fuel cells due to dry-out of the fuel cell, and improving deterioration of a membrane.

BRIEF DESCRIPTION OF THE DRAWINGS

The drawings are for reference in describing an exemplary embodiment of the present disclosure, so that it shall not be construed that the technical spirit of the present disclosure is limited to the accompanying drawings.

DETAILED DESCRIPTION OF THE EMBODIMENTS

Figure 1:
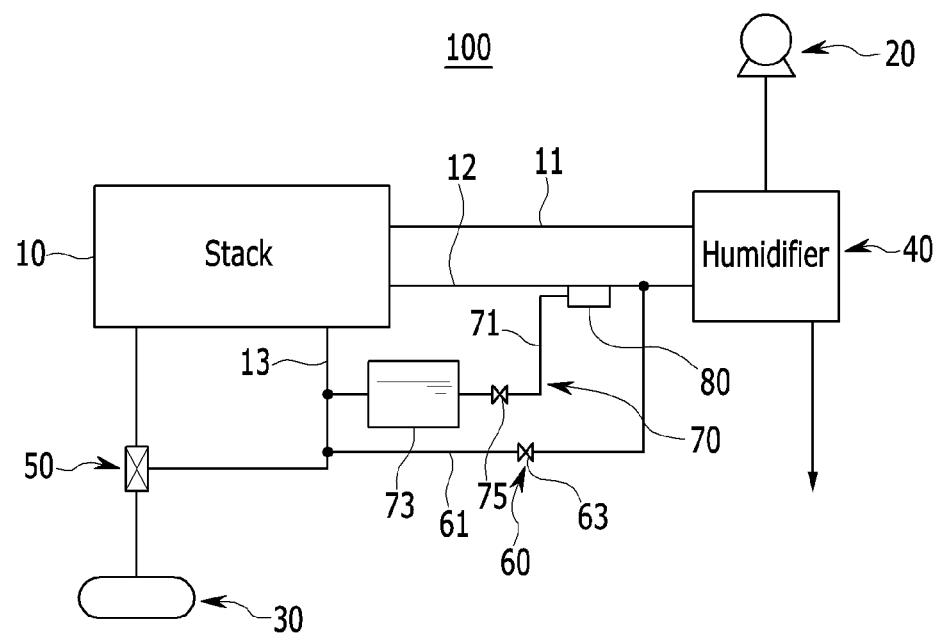
FIG. 1 is a block diagram schematically illustrating a configuration of a fuel cell system according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

A part irrelevant to the description will be omitted to clearly describe the present disclosure, and the same elements will be designated by the same reference numerals throughout the specification. In addition, the size and thickness of each configuration shown in the drawings are arbitrarily shown for understanding and ease of description, but the present disclosure is not limited thereto, and the thickness of layers, films, panels, regions, etc., are exaggerated for clarity.

Further, in the following detailed description, names of constituents, which are in the same relationship, are divided into "the first", "the second", and the like, but the present disclosure is not limited to the order in the following description. Throughout the specification, unless explicitly described to the contrary, the word "comprise" and variations such as "comprises" or "comprising", will be understood to imply the inclusion of stated elements but not the exclusion of any other elements. In addition, "unit", "means", "part", "member", or the like, which is described in the specification, means a unit of a comprehensive configuration that performs at least one function or operation.

FIG. 1 is a block diagram schematically illustrating a configuration of a fuel cell system according to an exemplary embodiment of the present disclosure. Referring to FIG. 1, a fuel cell system 100 according to an exemplary embodiment of the present disclosure is a power generation system of generating electrical energy by an electrochemical reaction of fuel and an oxidizer, and may be applied to, for example, a fuel cell vehicle driving an electric motor with the electrical energy.

In the exemplary embodiment of the present disclosure, fuel used in the fuel cell system 100 may be defined as hydrogen gas (hereinafter, referred to as "hydrogen" for convenience), and the oxidizer may be defined as air.

The fuel cell system 100 includes a fuel cell stack 10, an air supplier 20, a hydrogen supplier 30, a humidifier 40, and a hydrogen recirculator 50.

The fuel cell stack 10 is formed of an electricity generating assembly of fuel cells formed of a cathode and an anode. The fuel cell stack 10 may receive hydrogen supplied from the hydrogen supplier 30 and air from the air supplier 20 to generate the electrical energy by the electrochemical reaction of the hydrogen and the oxygen. The air supplier 20 may include an air compressor or an air blower, which is driven by receiving power and supplies air in the atmosphere to the cathode of the fuel cell stack 10. The hydrogen supplier 30 may include a hydrogen tank which compresses and stores hydrogen in a form of gas, and supplies the hydrogen to the anode of the fuel cell stack 10.

The humidifier 40 may include a membrane humidifier which membrane-humidifies air supplied from the air supplier 20 by using air discharged from the cathode of the fuel cell stack 10. The humidifier 40 may be connected with the fuel cell stack 10 through an air supply line 11 and an air exhaust line 12. The hydrogen recirculator 50 recirculates hydrogen discharged from the anode of the fuel cell stack 10 to the anode again, and may mix the hydrogen discharged from the fuel cell stack 10 through a hydrogen exhaust line 13 and hydrogen supplied from the hydrogen supplier 30 through an ejector and the like, and supply the mixed hydrogen to the anode of the fuel cell stack 10. Reference number 60 denotes a purger including a purge line 61, which connects the hydrogen exhaust line 13 and the air exhaust line 12, and a purge valve 63 installed in the purge line 61 in order to purge the hydrogen of the anode.

In addition, the fuel cell system 100 according to an exemplary embodiment of the present disclosure includes a condensate water processor 70 which stores and discharges the condensate water discharged from the fuel cell stack 10 through the hydrogen exhaust line 13. The condensate water processor 70 includes a drain line 71 which connects the air exhaust line 12 and the hydrogen exhaust line 13, which are described above, and a water trap 73 and a drain valve 75 which are installed in the drain line 71. Here, the water trap 73 may store the condensate water discharged from the anode of the fuel cell stack 10, and the drain valve 75 may selectively discharge the condensate water within the water trap 73 according to a detection signal of a level sensor (not illustrated) provided inside the water trap 73.

The fuel cell system 100 according to an exemplary embodiment of the present disclosure has a structure capable of adjusting the amount of humidification of air flowing into the fuel cell stack 10 with a simple configuration, without improving the flooding and dry-out conditions of the fuel cell by a regulative method.

That is, the present disclosure provides the fuel cell system 100 capable of adjusting humidity of air flowing into the fuel cell stack 10 by changing a structure of the condensate water processor 70 that stores and discharges condensate the water discharged from the fuel cell stack 10. To this end, the fuel cell system 100 according to an exemplary embodiment of the present disclosure may configure the condensate water processor 70 which further includes a water reservoir 80.

In the present disclosure, the water reservoir 80 is a buffer tank which temporarily stores the condensate water discharged from the water trap 73, and is installed at a connection point of the drain line 71 and the air exhaust line 12. The water reservoir 80 may store a part of condensate water under the flooding condition of the fuel cell, and supply the condensate water to the humidifier 40 through the air exhaust line 12 under the dry-out conditions of the fuel cell.

Figure 2:
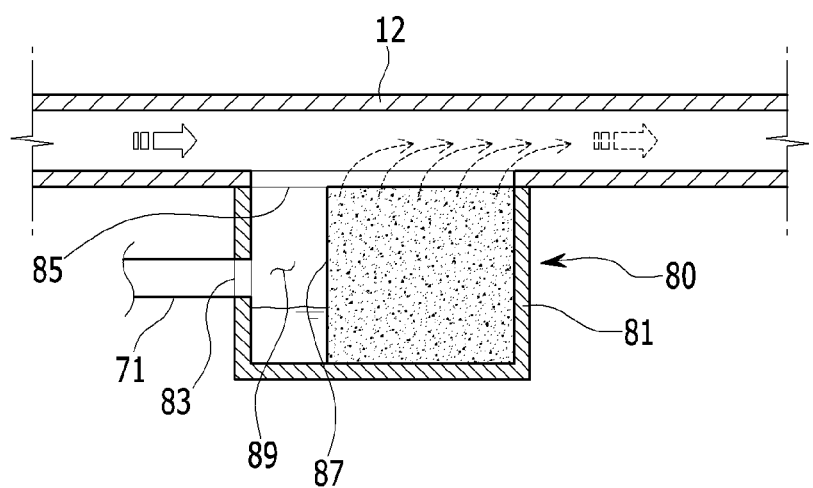
FIG. 2 is a cross-sectional diagram schematically illustrating a water reservoir applied to a fuel cell system according to an exemplary embodiment of the present disclosure.

FIG. 2 is a cross-sectional diagram schematically illustrating a water reservoir applied to a fuel cell system according to an exemplary embodiment of the present disclosure. Referring to FIGS. 1 and 2, the water reservoir 80 according to an exemplary embodiment of the present disclosure includes a tank 81 which stores condensate water.

The tank 81 is provided with an inlet 83 for inflow of condensate water discharged from the water trap 73, and the drain line 71 is connected to the inlet 83. In this case, the inlet 83 may be formed at a center of a side surface of the tank 81. The tank 81 is connected to a partial section of the air exhaust line 12 at the connection point of the drain line 71 and the air exhaust line 12, so that the tank 81 is disposed at a lower side of the air exhaust line 12. Here, the tank 81 includes an internal space of which an upper portion is partially opened, and the remaining portions are closed. That is, an opening portion 83 is formed on an upper surface of the tank 81, and the opening portion 85 may be connected to the partial section of the air exhaust line 12.

Further, in the present disclosure, a porous body 87 capable of absorbing the condensate water and evaporating the condensate water toward the air exhaust line 12 through the opening portion 85 is installed inside the tank 81. The porous body 87 may be formed of a porous material of steel use stainless (SUS), in order to meet the aforementioned inherent function. The porous body 87 may be installed in a space at an opposite side of the connection side of the drain line 71 in the internal space of the tank 81, that is, a space at an opposite side of the inlet 83. Accordingly, a condensate water storage space 89 having a set area for storing condensate water is formed at the inlet 83 side, which is the connection side of the drain line 71, inside the tank 81 separate from the porous body 87.

Hereinafter, an operation of the fuel cell system 100 according to an exemplary embodiment of the present disclosure, which is configured as described above, will be described in more detail with reference to the previously disclosed drawings, and the accompanying drawings.

Figure 3:
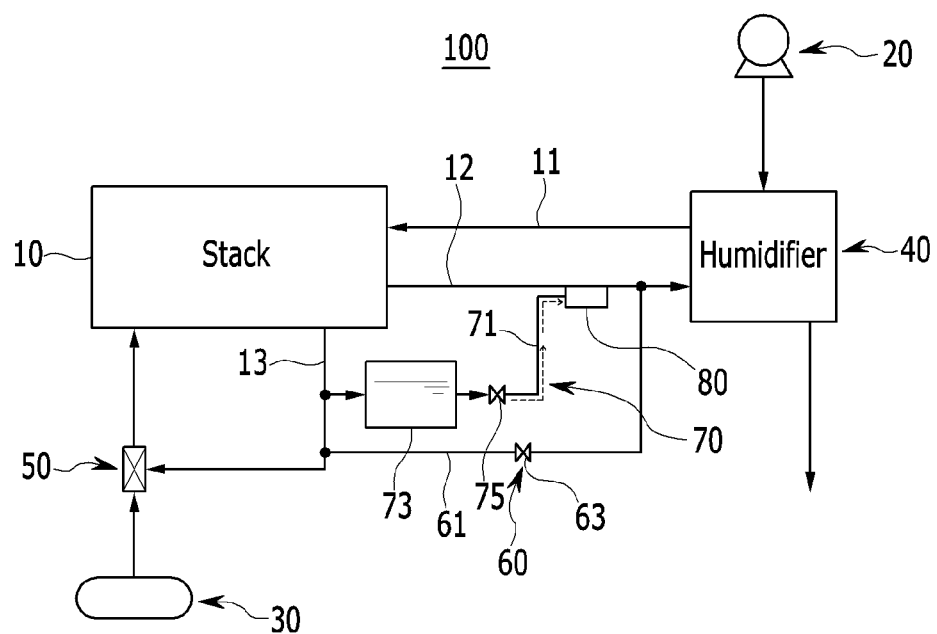
FIGS. 3 and 4 are diagrams for describing an operation of a fuel cell system according to an exemplary embodiment of the present disclosure.
Figure 4:
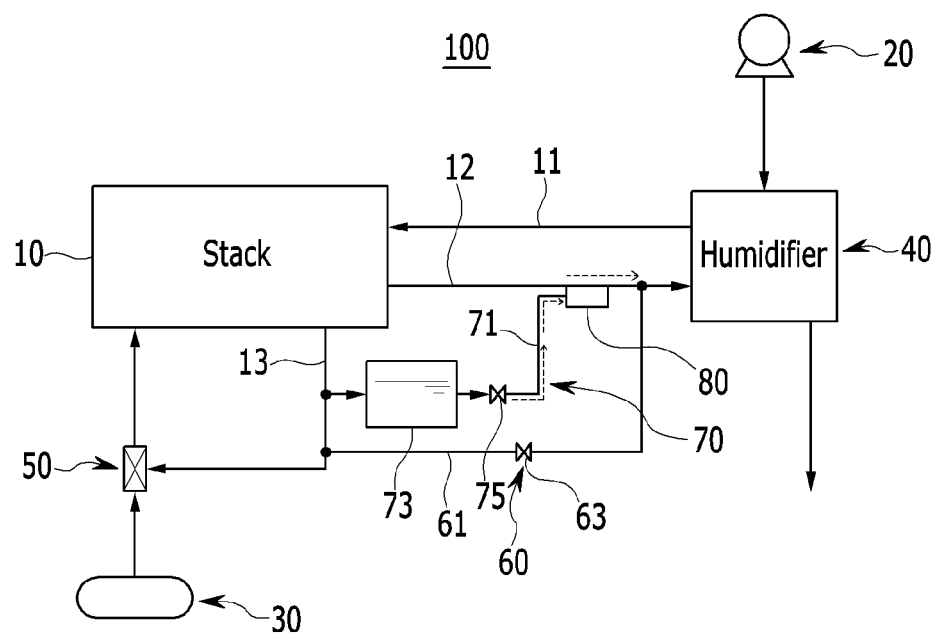

FIGS. 3 and 4 are diagrams for describing an operation of the fuel cell system according to the exemplary embodiment of the present disclosure.

Referring to FIG. 3, in the exemplary embodiment of the present disclosure, during the operation of the fuel cell system 100, air is supplied to the fuel cell stack 10 through the air supplier 20, and hydrogen is supplied to the fuel cell stack 10 through the hydrogen supplier 30.

Then, the fuel cell stack 10 generates electrical energy by an electrochemical reaction of hydrogen and oxygen by the fuel cells, discharges high-temperature and humid air from the cathode of the fuel cells through the air exhaust line 12 and discharges hydrogen containing moisture from the anode of the fuel cells through the hydrogen exhaust line 13. Here, the anode of the fuel cells discharges the hydrogen left after the reaction, and the hydrogen may be recirculated to the anode together with hydrogen supplied from the hydrogen supplier 30 through the hydrogen recirculator 50 again.

In this process, according to an exemplary embodiment of the present disclosure, the condensate water accumulated in the anode of the fuel cells is discharged through the hydrogen exhaust line 13, and the condensate water is collected in the water trap 73 through the drain line 71 of the condensate water processor 70. Further, the exhaust air discharged from the cathode of the fuel cells is supplied to the humidifier 40 through the air exhaust line 12, and the humidifier 40 humidifies the supply air supplied from the air supplier 20 as exhaust air, and supplies the humidified air to the cathode of the fuel cells.

When condensate water at a set level is stored in the aforementioned water trap 73, the condensate water within the water trap 73 is discharged through the drain valve 75 in an exemplary embodiment of the present disclosure.

Accordingly, in the present disclosure, the condensate water discharged from the water trap 73 may be stored inside the tank 81 of the water reservoir 80 through the drain line 71.

Here, the condensate water flowing into the tank 81 of the water reservoir 80 is temporarily stored in the condensate water storage space 89 and absorbed in the porous body 87. That is, the condensate water accommodated in the condensate water storage space 89 is absorbed in a lower portion of the porous body 87 by surface tension between a porous material of the porous body 87 and the condensate water and moves to an upper side of the porous body 87.

On the other hand, in the present disclosure, the condensate water discharged from the water trap 73 may be temporarily stored inside the tank 81 through the porous body 87 under the flooding condition of the fuel cell according to initial starting or a low-temperature operation of the fuel cell stack 10 as described above.

Accordingly, in the present disclosure, the condensate water is temporarily stored in the water reservoir 80 under the flooding condition of the fuel cell, thereby minimizing condensate water flowing into the humidifier 40 through the air exhaust line 12. And, it is possible to decrease the amount of humidification of air flowing into the fuel cell stack 10 by minimizing moisture flowing into the humidifier 40 under the flooding condition of the fuel cell, thereby minimizing a decrease in a cell voltage and the amount of catalyst loss of the fuel cells due to the flooding phenomenon of the fuel cell.

On the other hand, high-temperature and dry air is discharged from the fuel cell stack 10 through the air exhaust line 12 during the high-power operation of the fuel cell stack 10, and a dry-out phenomenon, in which the amount of moisture within the stack is insufficient due to excessive supply of air or the high-temperature operation may be generated.

In an exemplary embodiment of the present disclosure, as illustrated in FIG. 4, the high-temperature and dry air is discharged from the fuel cell stack 10 under the dry-out condition of the fuel cell, thereby evaporating the condensate water absorbed in the porous body 87 in the internal space of the water reservoir 80, as described above. And, the moisture evaporated from the porous body 87 may flow into the air exhaust line 12 through the opening portion 85 of the tank 81, and flow into the humidifier 40 together with the high-temperature and dry air discharged through the air exhaust line 12.

Accordingly, in the present disclosure, moisture may be supplied to the humidifier 40 through the water reservoir 80 under the dry-out condition of the fuel cell, and air containing the appropriate amount of moisture through the humidifier 40 may be supplied to the fuel cell stack 10 through the air supply line 11.

According to an exemplary embodiment of the present disclosure, it is possible to increase the amount of humidification of air flowing into the fuel cell stack 10 under the dry-out condition of the fuel cell, thereby decreasing a deviation of cell voltages of the fuel cells due to dry-out of the fuel cell, and improving deterioration of the membrane. Further, it is possible to improve performance of the fuel cell under the flooding condition and the dry-out condition of the fuel cell by improving a structure of the condensate water processor 70 without adopting the regulative method, and therefore it is not necessary to additionally use power and fuel, thereby improving fuel efficiency of a vehicle.

While this disclosure has been described in connection with what is presently considered to be practical exemplary embodiments, it is to be understood that the disclosure is not limited to the disclosed embodiments, but on the contrary, is intended to cover various modifications and equivalent arrangements included within the spirit and scope of the appended claims.

What is claimed is:

1. A fuel cell system for adjusting the amount of humidification of reaction gas, the system comprising:
a fuel cell stack in which fuel cells are stacked;
an air supplier configured to supply air to the fuel cell stack;
a humidifier configured to humidify the air supplied through the air supplier with air discharged from the fuel cell stack;
a hydrogen supplier configured to supply hydrogen to the fuel cell stack; and
a condensate water processor configured to store and discharge condensate water discharged from the fuel cell stack through a hydrogen exhaust line,
wherein the condensate water processor includes:
a drain line connecting an air exhaust line and the hydrogen exhaust line of the fuel cell stack;
a water trap installed in the drain line, and storing the condensate water; and
a water reservoir installed at a connection point connecting the drain line and the air exhaust line, and storing the condensate water discharged from the water trap, and wherein a porous body, which absorbs and evaporates the condensate water, is installed inside the water reservoir.

2. The fuel cell system of claim 1, wherein:
the water reservoir stores a part of the condensate water under a flooding condition of the fuel cell and supplies the condensate water to the humidifier through the air exhaust line under a dry-out condition of the fuel cell.

3. The fuel cell system of claim 1, wherein:
the water reservoir is disposed at a lower side of the air exhaust line.

4. The fuel cell system of claim 3, wherein:
the drain line is connected to a center of a side surface of the water reservoir.

5. The fuel cell system of claim 3, wherein:
the water reservoir is connected to a partial section of the air exhaust line.

6. The fuel cell system of claim 5, wherein:
the water reservoir is provided with an opening portion in an upper surface thereof, and the opening portion is connected to the partial section of the air exhaust line.

7. The fuel cell system of claim 1, wherein:
the porous body is formed of a porous material of steel use stainless (SUS).

8. The fuel cell system of claim 1, wherein:
a condensate water storage space having a set area is formed inside the water reservoir separately from the porous body.

9. The fuel cell system of claim 8, wherein:
the drain line is connected to a center of a side surface of the water reservoir, and
the condensate water storage space is formed at a connection side of the drain line inside the water reservoir.

10. The fuel cell system of claim 1, wherein:
a drain valve for selectively discharging the condensate water accommodated in the water trap is installed in the drain line.

11. A fuel cell system for adjusting the amount of humidification of reaction gas, the system comprising:
a fuel cell stack:
an air supplier:
a humidifier;
a hydrogen supplier;
a drain line configured to connect an air exhaust side of the fuel cell stack and a hydrogen exhaust side of the fuel cell stack;
a water trap installed in the drain line and configured to store condensate water discharged from the fuel cell stack; and a water reservoir installed at a connection point of the air exhaust side of the fuel cell stack and the drain line, and configured to temporarily store condensate water discharged from the water trap wherein a porous body, which absorbs and evaporates the condensate water, is installed inside the water reservoir.

12. The fuel cell system of claim 11, wherein:

the drain line is connected to a hydrogen exhaust line discharging hydrogen from the fuel cell stack and an air exhaust line connecting the fuel cell stack and the humidifier, the water reservoir is disposed at a lower side of the air exhaust line at a connection point connecting the drain line and the air exhaust line, and the drain line is connected to a center of a side surface of the water reservoir at the connection point.

13. The fuel cell system of claim 12, wherein:

the porous body is installed at an opposite side space to a connection side of the drain line.

* * * * *